United States Patent [19]

Starr

[11] Patent Number: 4,530,244

[45] Date of Patent: Jul. 23, 1985

[54] SEMICONDUCTOR PRESSURE TRANSDUCER

[75] Inventor: James B. Starr, St. Paul, Minn.

[73] Assignee: Honeywell Inc., Minneapolis, Minn.

[21] Appl. No.: 623,632

[22] Filed: Jun. 25, 1984

Related U.S. Application Data

[63] Continuation of Ser. No. 336,995, Jan. 4, 1982, abandoned.

[51] Int. Cl.³ .................................................. G01L 9/06
[52] U.S. Cl. ........................................ 73/727; 73/721; 338/4; 338/42
[58] Field of Search ................. 73/721, 720, 727, 726, 73/DIG. 4, 708, 729; 338/4, 9, 42

[56] References Cited

U.S. PATENT DOCUMENTS

| | | | |
|---|---|---|---|
| 3,341,794 | 9/1967 | Stedman | 73/720 |
| 3,697,917 | 10/1972 | Orth | 338/4 |
| 4,333,349 | 1/1982 | Mallon | 73/727 |

FOREIGN PATENT DOCUMENTS 0119031  9/1980  Japan .................................... 73/727

Primary Examiner—Donald O. Woodiel
Attorney, Agent, or Firm—Lewis P. Elbinger

[57] ABSTRACT

A transducer for sensing pressure formed of a single crystal semiconductor chip having a cavity formed in one surface, wherein a tube to communicate pressure to the cavity surrounds the cavity, wherein pressure measuring sensors are disposed opposite the cavity and wherein additional pressure-responsive sensors are disposed on the chip to provide a signal for compensating for zero shift temperature and pressure induced signals generated by the measuring sensors.

8 Claims, 3 Drawing Figures

SEMICONDUCTOR PRESSURE TRANSDUCER

This application is a continuation of application Ser. No. 336,995, filed Jan. 4, 1982, now abandoned.

BACKGROUND OF THE INVENTION

This invention relates to semiconductor pressure transducers and, more particularly, to such transducers which are formed to compensate for signals occurring at zero pressure differential.

The semiconductor pressure transducers known in the prior art employ a diaphragm responsive to the pressure differential across the two surfaces thereof. The transducer is formed of a single crystal semiconductor chip. A circular cavity is formed in one surface of the chip, and a cylindrical glass tube for communicating the pressure to be measured has one end thereof bonded to such one surface of the chip to surround the cavity. The diaphragm comprises the portion of the chip overlying the cavity. Stress sensors are disposed on the other surface of the chip above the cavity. Stress sensors which are widely used for this purpose exhibit a piezoresistive characteristic, whereby the resistance of the sensor varies with the stress experienced by the sensor as the stress in the chip changes with the differential pressure.

Normally at least one pair of radial stress sensors and one pair of circumferential stress sensors are disposed on the diaphragm. These sensors are electrically connected together, such as in a bridge circuit, to provide signals representing the differential pressure on the diaphragm.

Semiconductor pressure transducers of the type described generate false or spurious signals, termed "zero shift", as the static pressure (i.e., common to both surfaces of the diaphragm) or the temperature of the transducer varies. Specifically "zero shift" means a signal that changes as a result of some influence that occurs at zero pressure differential across the transducer diaphragm. Because of this zero shift phenomenon the semiconductor pressure transducer of the prior art requires some form of electronic signal compensation in order to be employed reliably for the measurement of differential pressures.

Prior art semiconductor pressure transducers have employed separate pressure sensors and separate temperature sensors to generate separate signals to separately compensate for the two sources of zero shift. However, it would be desirable to provide a single type of device capable of providing a single signal capable of compensating for both sources of zero shift.

Accordingly, it is the principal object of the instant invention to provide an improved semiconductor pressure transducer.

Another object of the instant invention is to provide a semiconductor pressure transducer provided with means for compensating for the zero shift characteristic.

Another object of the instant invention is to provide a semiconductor pressure transducer provided with a single type means for compensating for spurious signals caused by both static pressure changes and temperature variations.

SUMMARY OF THE INVENTION

In accordance with the instant invention, the above-mentioned objects are achieved by providing a semiconductor pressure transducer of the type comprising a single crystal semiconductor square chip. A circular cavity is formed in one surface of the chip, whereby the portion of the chip overlying the cavity is sensitive to the difference in pressure on the two faces of such portion and thereby constitutes a pressure sensitive diaphragm. A cylindrical tube, of different material than the chip has one end thereof bonded to such one surface of the chip and surrounds the cavity. The tube communicates the pressure to be measured to the diaphragm. A set of four stress sensors are disposed on the other surface of the chip above the cavity to provide a signal principally representing the differential pressure across the diaphragm. Another set of four stress sensors is disposed on each other chip surface opposite the bonded end of the pressure-communicating tube to provide a signal principally comprising the zero shift signals caused by static pressure on the diaphragm and temperature variation. This latter signal can be used to compensate for the zero shift signal components in the first-mentioned signal.

BRIEF DESCRIPTION OF THE DRAWING

The invention will be described with reference to the accompanying drawing, wherein.

DESCRIPTION OF THE PREFERRED EMBODIMENT

Figure 1:
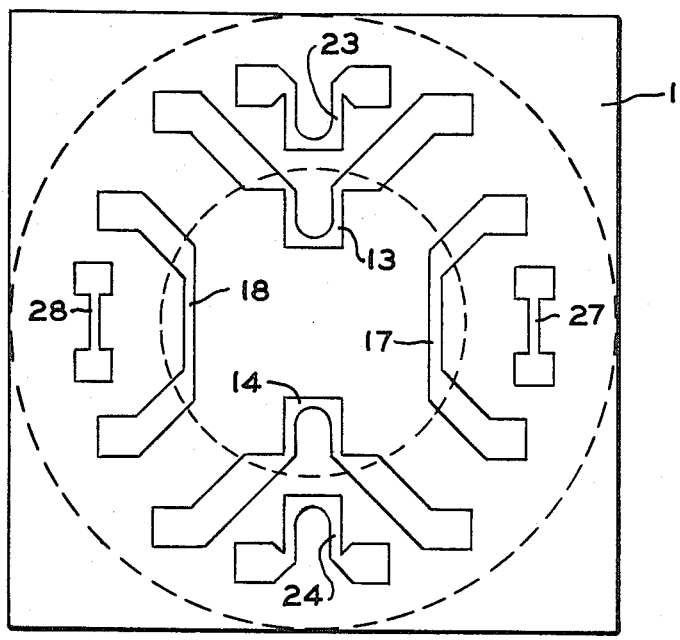
FIG. 1 is a top view of an embodiment of the instant invention.

The semiconductor pressure transducer shown schematically in FIG. 1 comprises a thin square semiconductor chip 1. Chip 1 is comprised of a single crystal semiconductor material, such as silicon.

A circular cavity, shown generally by the reference numeral 3, is formed in the lower, or first, surface of chip 1. A cylindrical tube 5, shown in partial cross-section, is bonded to the lower surface of chip 1 to surround cavity 3. Tube 5 may be formed from pyrex, for example. Tube 5 functions to communicate the pressure to be sensed to cavity 3, whereby the portion of chip 1 overlying cavity 3 forms a diaphragm in which the stresses induced therein depend on the difference between the pressure communicated by the tube and the pressure on the upper, or second, surface of chip 1.

Radial stress sensors 13 and 14 are disposed on the second surface of chip 1 above cavity 3. Circumferential stress sensors 17 and 18 are also disposed on such second surface above cavity 3. Sensors 13, 14, 17 and 18 are formed integrally with chip 1 by injecting, such as by diffusion, an impurity, such as boron, into the surface of chip 1 in surface regions above cavity 3 and defined according to the desired shapes of the sensors. Such a sensor exhibits a piezoresistive characteristic; i.e., its resistance changes with the stress experienced by the sensor.

The stresses induced in chip 1 are sensed by the stress sensors, whose resistance varies correspondingly, and such stresses are generally described by reference to the axes of the sensors. In FIG. 1, the sensing portions of sensors are shown in the form of strips. In practice a particular sensor may be formed of a plurality of parallel strips connected in series. Usually, these sensors are oriented in correspondence to the cylindrical coordinates of the cavity or pressure-communicating tube.

Thus, sensors 13 and 14 of FIG. 1 are disposed with the lengths of their sensing portions oriented along a radial direction of the cylindrical coordinates. Sensors 17 and 18 have the lengths of their sensing portions oriented along a circumferential (sometimes termed tangential) direction of the cylindrical coordinates and are symmetrically disposed about a radial direction of the coordinates.

While sensors 13, 14, 17 and 18 are principally responsive to the stresses induced in the diaphragm as a consequence of the amount of pressure difference on the two surfaces of the diaphragm, they are also responsive to the stresses occurring in the diaphragm even when the pressures on its two surfaces are equal and to variations in the temperature of the transducer. One important source of the zero shift stresses due to pressure is the bond between the unlike materials of chip 1 and tube 5. Accordingly, when the sensors are connected into a signal generating circuit, such as a constant current wheatstone bridge, false or spurious signals, the zero shift signals, will be delivered by the circuit with zero pressure difference on the diaphragm. These zero shift signals also will be components of the total signal delivered when a finite pressure difference appears across the diaphragm.

To obviate this problem, the instant invention provides auxiliary sensors which are principally responsive to those stresses occurring in the chip when the pressure difference across the diaphragm is zero and to those stress changes caused by variations in the temperature of the transducer. These auxiliary sensors are not significantly responsive to the stresses induced in the diaphragm as a consequence of pressure differences across the two surfaces of the diaphragm. Accordingly, when these auxiliary sensors are connected into a signal generating circuit, such as a constant current wheatstone bridge, the circuit will deliver a signal whose principal components are the zero shift signals. The signal delivered by the latter circuit can then be used to cancel out the zero shift signal components in the signal provided by the circuit comprising the principal sensors 13, 14, 17 and 18, without significantly affecting the principal pressure-representing component of the latter signal.

In implementation of the instant invention auxiliary stress sensors 23, 24, 27 and 28 are provided. Radial stress sensors 23 and 24 are disposed on the upper, or second, surface of chip 1 above the end surface 30 of tube 5, which is the end of tube 5 that is bonded to the lower surface of chip 1. Circumferential stress sensors 27 and 28 are also disposed on the upper surface of chip 1 above end surface 30. Sensors 23, 24, 27 and 28 exhibit a piezoresistive characteristic and may be formed in the same manner as previously described herein with respect to sensors 13, 14, 17 and 18.

With zero pressure difference across the diaphragm, stresses induced in the upper surface of the chip directly above the chip-tube bond are much larger than those produced in the diaphragm. On the other hand, stresses induced in the diaphragm surface by a pressure difference across its two surfaces are much larger than those produced on the upper surface of chip 1 above the chip-tube bond.

Accordingly, the signal generated by an auxiliary circuit formed of sensors 23, 24, 27 and 28 will comprise zero shift components corresponding to zero differential pressure which are relatively large compared to the components caused by a pressure difference on the diaphragm. Conversely, the signal generated by a principal circuit formed of sensors 13, 14, 17 and 18 will comprise components caused by a pressure difference in the diaphragm which are much larger than the zero shift components corresponding to zero differential pressure. By applying the signal delivered by the auxiliary circuit to that delivered by the principal circuit, the zero shift components in the two signals can be caused to be effectively cancelled, to leave a resultant signal representing only the pressure difference on the diaphragm.

Figure 2:
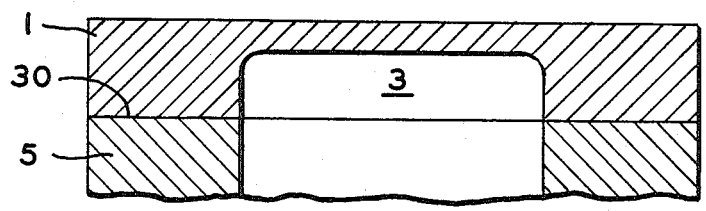
FIG. 2 is a sectional view of the embodiment of FIG. 1.
Figure 3:
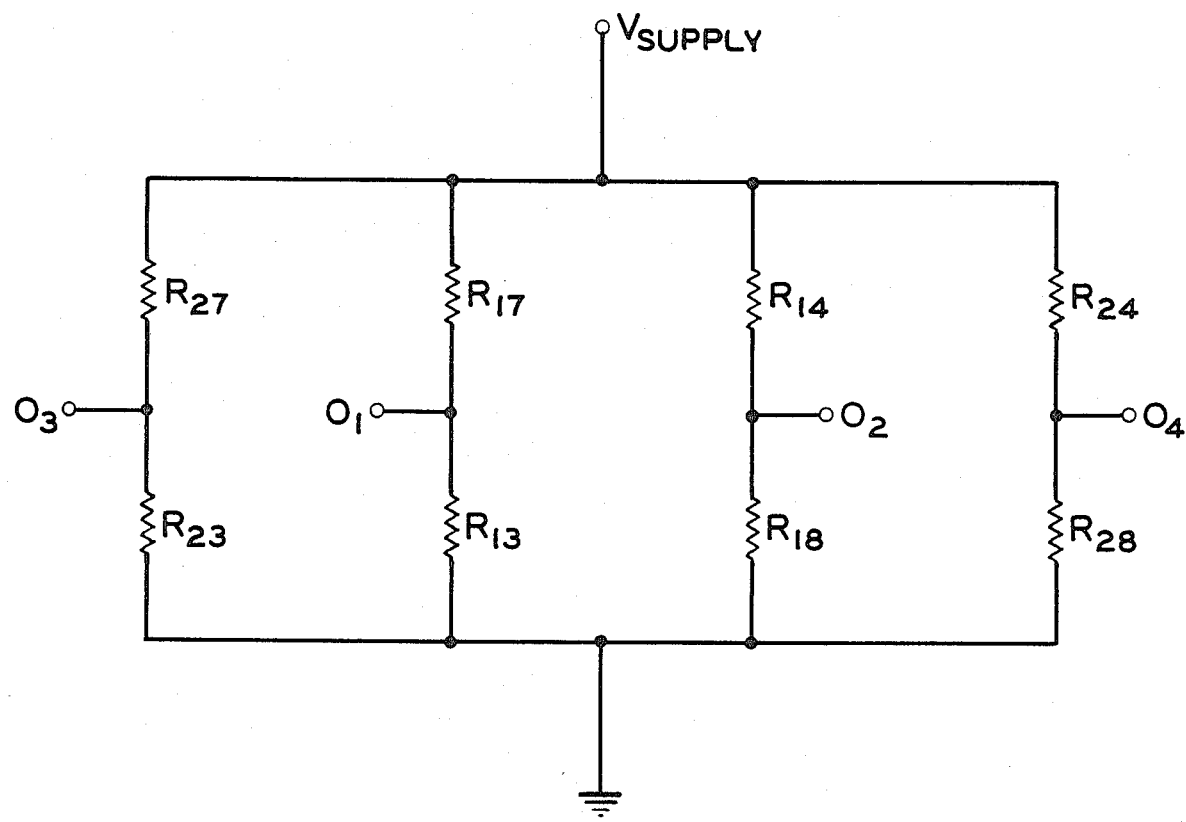
FIG. 3 is diagram of circuits for connecting together the sensors of the embodiment of FIGS. 1 and 2.

The circuits of FIG. 3 are one form of signal generating circuits for use with the transducer of the FIGS. 1 and 2. The circuits comprise a pair of bridges, each, in turn, comprising four resistive elements. Each resistive element represents the resistance of a correspondingly numbered sensor of the transducer of FIGS. 1 and 2. Thus, $R_{17}$ represents the resistance of sensor 17.

Sensors 13, 14, 17 and 18 are connected to form the principal bridge circuit, which delivers an output signal across output terminals $O_1$–$O_2$. Sensors 23, 24, 27 and 28 form the auxiliary bridge, circuit, which delivers an output signal across output terminals $O_3$–$O_4$. According to the principles described previously herein, the signal delivered at output terminals $O_3$–$O_4$ has the zero shift components as its principal components, whereas the signal delivered at output terminals $O_1$–$O_2$ has the components representing the pressure difference on the diaphragm as its principal components. By means well-known in the art, both signals can be applied to an electronic compensating circuit to provide for the signal delivered by the auxiliary bridge circuit to effectively cancel any zero shift components in the signal delivered by the principal bridge circuit.

While the principles of the invention have now been made clear in an illustrative embodiment, there will be immediately obvious to those skilled in the art any modifications in structure, arrangements, the elements and components used in the practice of the invention, and otherwise, which are particularly adapted for specific environments and operating requirements, without departing from those principles. The appended claims therefore intended to cover any such modifications, within the limits only of the true spirit and scope of the invention.

I claim:

1. In a semiconductor pressure transducer comprising a single crystal semiconductor chip, wherein a circular cavity is formed in one surface of said chip; a cylindrical tube having one end thereof bonded to said one surface of said chip and surrounding said cavity; and at least one principal stress sensor disposed on the other surface of said chip opposite said cavity; the improvement comprising:

at least one auxiliary stress sensor disposed on said other surface of said chip opposite to said one end of said tube;

said principal stress sensor and said auxiliary stress sensor being connected in circuit to effectively cancel any zero shift components in the signal generated by said principal stress sensor.

2. The transducer of claim 1, wherein said sensors are formed of a material having a piezoresistive characteristic.

3. The transducer of claim 2, wherein said tube is formed of a different material than the material of said chip.

4. The transducer of claim 3, wherein said tube is formed of pyrex.

5. In a semiconductor pressure transducer comprising a single crystal semiconductor chip, wherein a circular cavity is formed in one surface of said chip; a cylindrical tube having one end thereof bonded to said one surface of said chip and surrounding said cavity; and at least one principal stress sensor disposed on the other surface of said chip opposite said cavity; the improvement comprising:
- at least one auxiliary stress sensor disposed on said chip in a region wherein the resistance of said auxiliary sensor depends more on the stresses in said chip in the absence of a pressure difference across said chip than on the stresses induced in said chip as a result of such a pressure difference;
- said principal stress sensor and said auxiliary stress sensor being connected in circuit to effectively cancel any component generated in the signal provided by said principal sensor which is caused by stresses in said chip in the absence of a pressure difference across said chip.

6. A semiconductor pressure transducer comprising:
- a single crystal semiconductor chip having a circular cavity formed in one surface thereof, wherein the residual portion of said chip overlying said cavity functions as a pressure sensitive diaphragm;
- a cylindrical tube having one end thereof bonded to said one surface to surround said cavity;
- at least one principal stress sensor disposed on the other surface of said chip on the diaphragm portion thereof; and
- at least one auxiliary sensor disposed on said other surface of said chip opposite to said one end of said tube;
- said principal stress sensor and said auxiliary stress sensor being connected in circuit to effectively cancel any zero shift components in the signal generated by said principal stress sensor.

7. The transducer of claim 6, comprising a plurality of said principal stress sensors and a plurality of said auxiliary stress sensors.

8. A semiconductor pressure transducer comprising:
- a single crystal semiconductor chip having a circular cavity formed in one surface thereof, wherein the residual portion of said chip overlaying said cavity functions as a pressure sensitive diaphragm;
- a cylindrical tube having one end thereof bonded to said one surface to surround said cavity;
- a plurality of principal stress sensors disposed on the other surface of said chip on the diaphragm portion thereof;
- a plurality of auxiliary stress sensors disposed on said other surface of said chip opposite to said one end of said tube;
- wherein said principal stress sensors are electrically connected to form a first bridge circuit, and said auxiliary stress sensors are electrically connected to form a second bridge circuit.

* * * * *